United States Patent
Suhre et al.

(10) Patent No.: US 10,604,261 B2
(45) Date of Patent: Mar. 31, 2020

(54) MOVABLE OTTOMAN FOR AN AIRCRAFT SEAT

(71) Applicant: B/E Aerospace, Inc., Winston Salem, NC (US)

(72) Inventors: Ryan J. Suhre, Winston Salem, NC (US); Michael J. Schmid, Winston Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 143 days.

(21) Appl. No.: 15/953,332

(22) Filed: Apr. 13, 2018

(65) Prior Publication Data

US 2019/0308735 A1    Oct. 10, 2019

Related U.S. Application Data

(60) Provisional application No. 62/655,196, filed on Apr. 9, 2018.

(51) Int. Cl.
*B64D 11/06* (2006.01)
(52) U.S. Cl.
CPC .............................. *B64D 11/0643* (2014.12)
(58) Field of Classification Search
None
See application file for complete search history.

(56) References Cited

U.S. PATENT DOCUMENTS

| 5,183,308 | A |  | 2/1993 | Koga et al. |
|---|---|---|---|---|
| 5,352,020 | A | * | 10/1994 | Wade ................. B64D 11/0643 297/423.26 |
| 6,059,367 | A |  | 5/2000 | Rogers |
| 6,095,610 | A |  | 8/2000 | Okajima et al. |
| 6,227,489 | B1 | * | 5/2001 | Kitamoto ............... B64D 11/00 244/118.5 |
| 6,305,644 | B1 |  | 10/2001 | Beroth |
| 6,318,785 | B1 | * | 11/2001 | Tousignant .......... B60N 2/0228 296/75 |
| 6,412,864 | B1 |  | 7/2002 | Larson |
| 6,439,636 | B1 |  | 8/2002 | Kuo |

(Continued)

FOREIGN PATENT DOCUMENTS

| DE | 20 2016 004 888 U1 | 11/2016 |
|---|---|---|
| WO | WO-2008/107689 A1 | 9/2008 |

OTHER PUBLICATIONS

International Search Report and Written Opinion on PCT/US2019/023892 dated Aug. 29, 2019. 20 pages.

*Primary Examiner* — David E Allred
(74) *Attorney, Agent, or Firm* — Donna P. Suchy

(57) ABSTRACT

An ottoman for an aircraft seat includes a guide assembly, a foot platform, and an actuator assembly. The guide assembly is configured to couple to a frame of the aircraft seat. The guide assembly includes a guide and a slide that is translatable along the guide. The foot platform is coupled to the slide. The actuator assembly is configured to selectively translate the slide along the guide to reposition the foot platform between a stowed position and a deployed position. The actuator assembly includes an actuator and an arm. The arm defines a first interface coupled to the slide and a second interface coupled to the actuator. Engagement of the actuator causes the arm to pivot and move the slide along the guide.

19 Claims, 12 Drawing Sheets

(56) References Cited

U.S. PATENT DOCUMENTS

| | | |
|---|---|---|
| 6,648,418 B2 | 11/2003 | Bergeron et al. |
| 6,832,741 B2 | 12/2004 | Jarosz |
| 7,108,329 B1 | 9/2006 | Clough |
| 7,114,770 B2 | 10/2006 | Murphy |
| 7,240,943 B2 | 7/2007 | Williamson et al. |
| 7,318,622 B2 | 1/2008 | Rezag et al. |
| 7,357,450 B2 | 4/2008 | Rogers |
| 7,429,083 B2 | 9/2008 | Tsuji et al. |
| 7,445,279 B2 | 11/2008 | Crum |
| 7,641,277 B2 | 1/2010 | Lawson et al. |
| 8,297,693 B2 | 10/2012 | Hoffman et al. |
| 8,360,515 B2 | 1/2013 | Crum |
| 8,398,165 B2 | 3/2013 | Lawson |
| 8,398,168 B2 | 3/2013 | Lawson |
| 8,419,122 B2 | 4/2013 | Lawson et al. |
| 8,485,470 B2 | 7/2013 | Hankinson et al. |
| 8,517,463 B2 | 8/2013 | Murphy et al. |
| 8,616,626 B2 | 12/2013 | Wiecek |
| 8,696,054 B2 | 4/2014 | Crum |
| 8,714,638 B2 | 5/2014 | Hoffman et al. |
| 8,727,433 B2 | 5/2014 | Lawson |
| 8,944,498 B2 | 2/2015 | Lawson |
| 8,944,513 B2 | 2/2015 | Suzuki et al. |
| 9,039,078 B2 | 5/2015 | Lawson et al. |
| 9,125,496 B2 | 9/2015 | Wieland et al. |
| 9,332,845 B2 | 5/2016 | Nagayasu |
| 9,375,089 B2 | 6/2016 | Lawson et al. |
| 9,386,857 B2 | 7/2016 | Lawson et al. |
| 9,433,294 B2 | 9/2016 | Donovan et al. |
| 9,468,295 B2 | 10/2016 | Lawson |
| 9,700,140 B2 | 7/2017 | Lawson |
| 9,743,772 B2 | 8/2017 | Rivera |
| 9,844,269 B2 | 12/2017 | Bryant |
| 9,855,871 B2 | 1/2018 | Aita et al. |
| 9,856,025 B2 | 1/2018 | Jasny et al. |
| 9,873,356 B2 | 1/2018 | Kuno et al. |
| 9,962,004 B2 | 5/2018 | Bryant et al. |
| 9,986,837 B2 | 6/2018 | Czumaj-Bront |
| 10,010,185 B2 | 7/2018 | Adams et al. |
| 10,350,121 B2 * | 7/2019 | Bergman ................. A61G 5/14 |
| 2006/0041359 A1 * | 2/2006 | Ohtsubo ............... B60N 2/0252 |
| | | 701/45 |
| 2007/0158992 A1 | 7/2007 | Dowty et al. |
| 2008/0231090 A1 * | 9/2008 | Takeda ..................... B60N 2/06 |
| | | 297/83 |
| 2008/0236452 A1 | 10/2008 | Pratt et al. |
| 2009/0088930 A1 * | 4/2009 | Ohtsubo ............... B60N 2/0252 |
| | | 701/49 |
| 2010/0253129 A1 * | 10/2010 | Dowty .................. B64D 11/064 |
| | | 297/85 M |
| 2012/0112035 A1 | 5/2012 | Volke et al. |
| 2012/0126595 A1 | 5/2012 | Petrucci et al. |
| 2014/0246886 A1 | 9/2014 | Savard et al. |
| 2015/0008072 A1 * | 1/2015 | Knox ........................ E04G 1/22 |
| | | 182/141 |
| 2015/0115684 A1 * | 4/2015 | Weber .................... B60N 3/063 |
| | | 297/423.15 |
| 2015/0202103 A1 * | 7/2015 | Olst ........................ A61G 5/04 |
| | | 297/423.32 |
| 2016/0052633 A1 | 2/2016 | Lawson et al. |
| 2016/0325838 A1 | 11/2016 | Erhel |
| 2016/0367030 A1 | 12/2016 | Donovan et al. |
| 2017/0071352 A1 | 3/2017 | Adams et al. |
| 2018/0029716 A1 | 2/2018 | Sieben |
| 2019/0233119 A1 * | 8/2019 | Oleson ................... B60N 2/143 |

* cited by examiner

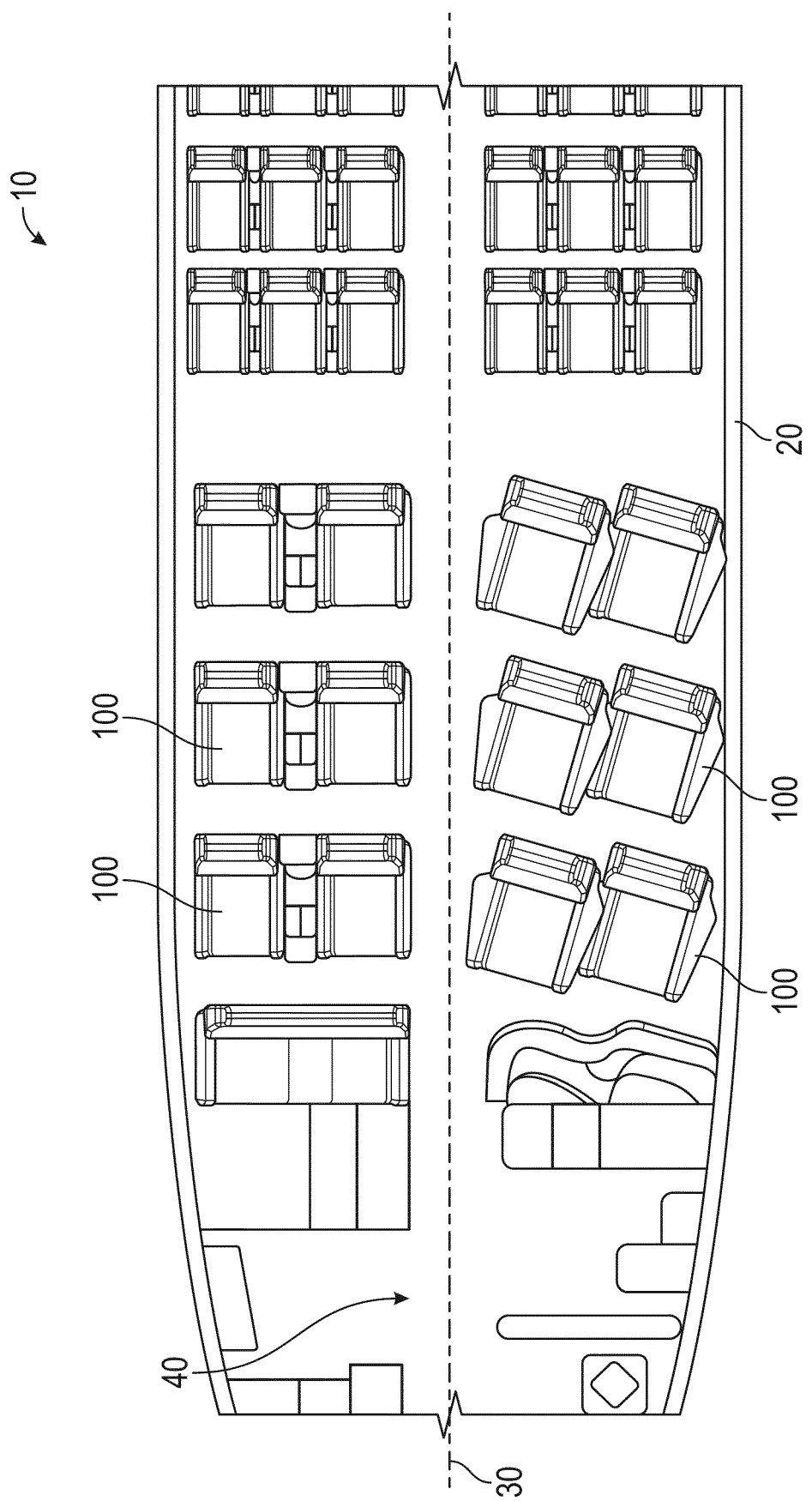

MOVABLE OTTOMAN FOR AN AIRCRAFT SEAT

CROSS-REFERENCE TO RELATED PATENT APPLICATIONS

This application claims the benefit of U.S. Provisional Application No. 62/655,196, filed Apr. 9, 2018, which is incorporated herein by reference in its entirety.

BACKGROUND

Aircraft seats, especially aircrafts seats in premium cabins of an aircraft, may include ottomans. The ottomans may increase overall flight enjoyability by providing increased comfort for the passengers.

SUMMARY

In one aspect, the inventive concepts disclosed herein are directed to an ottoman for an aircraft seat. The ottoman includes a guide assembly, a foot platform, and an actuator assembly. The guide assembly is configured to couple to a frame of the aircraft seat. The guide assembly includes a guide and a slide that is translatable along the guide. The foot platform is coupled to the slide. The actuator assembly is configured to selectively translate the slide along the guide to reposition the foot platform between a stowed position and a deployed position. The actuator assembly includes an actuator and an arm. The arm defines a first interface coupled to the slide and a second interface coupled to the actuator. Engagement of the actuator causes the arm to pivot and move the slide along the guide.

In a further aspect, the inventive concepts disclosed herein are directed to an aircraft seating unit. The aircraft seating unit includes a base, a seat, a housing, and an ottoman. The base is configured to couple to a deck of an aircraft. The seat is coupled to the base. The housing is coupled to the base and encloses frame elements of at least one of the base and the seat. The housing defines a recess. The ottoman is disposed within the recess. The ottoman includes a platform that is selectively deployable from the recess from a stowed position to a deployed position.

In a further aspect, the inventive concepts disclosed herein are directed to an ottoman for an aircraft seat. The ottoman includes a guide assembly, a foot platform, and an actuator assembly. The guide assembly includes a guide and a slide that is translatable along the guide. The foot platform is coupled to the slide. The actuator assembly is configured to selectively translate the slide along the guide to reposition the foot platform between a stowed position and a deployed position. The guide defines a translation axis that is angled relative to a vertical axis such that, as the slide translates along the guide, the foot platform moves both vertically and horizontally.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1 is a schematic view of a seating arrangement for an aircraft having a plurality of seating units according to the inventive concepts disclosed herein.

DETAILED DESCRIPTION

Figure 2A:
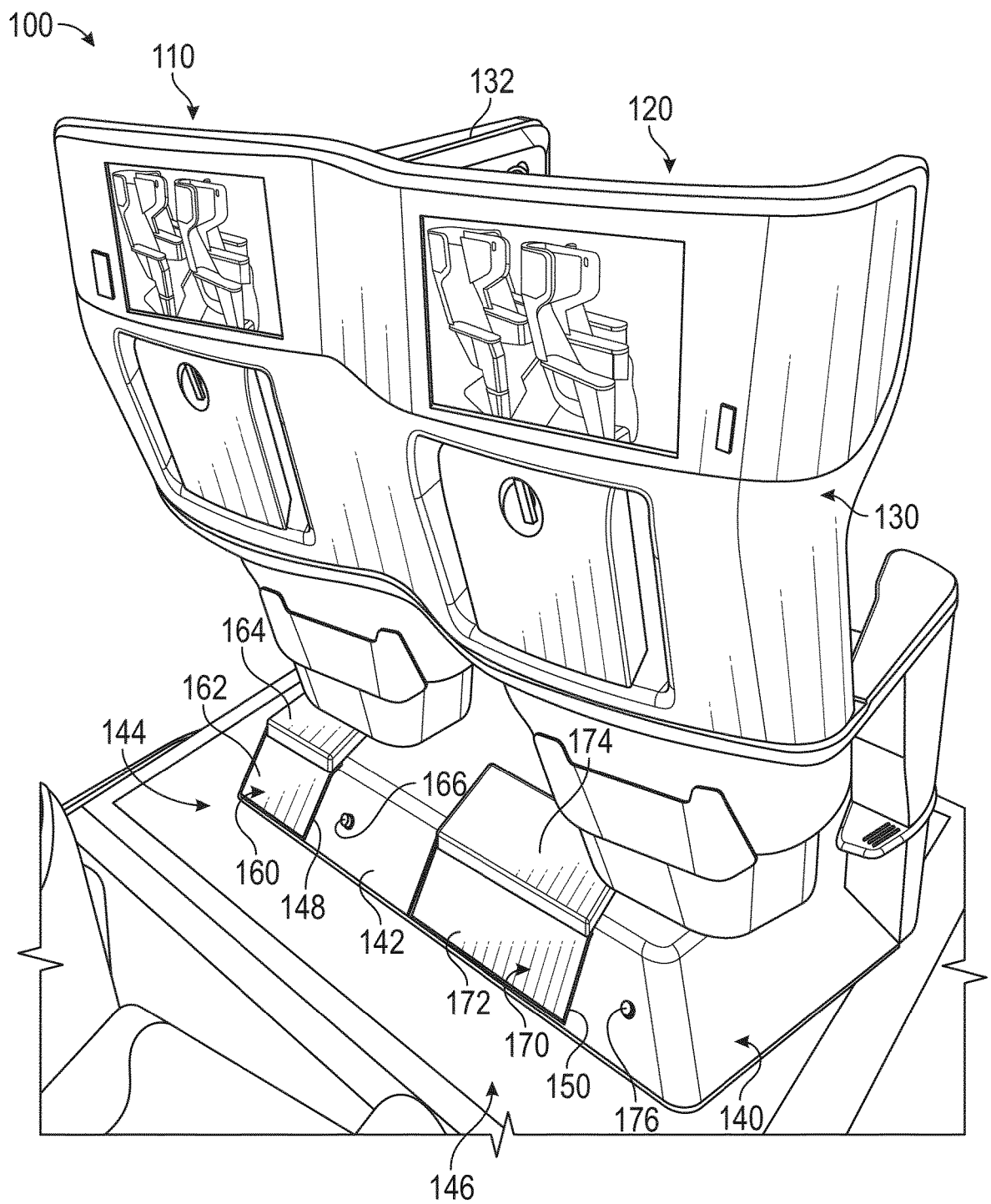
FIGS. 2A-2C are various rear perspective views of one of the plurality of seating units of FIG. 1 having (i) a first seat and a first ottoman and (ii) a second seat and a second ottoman according to the inventive concepts disclosed herein.
Figure 2B:
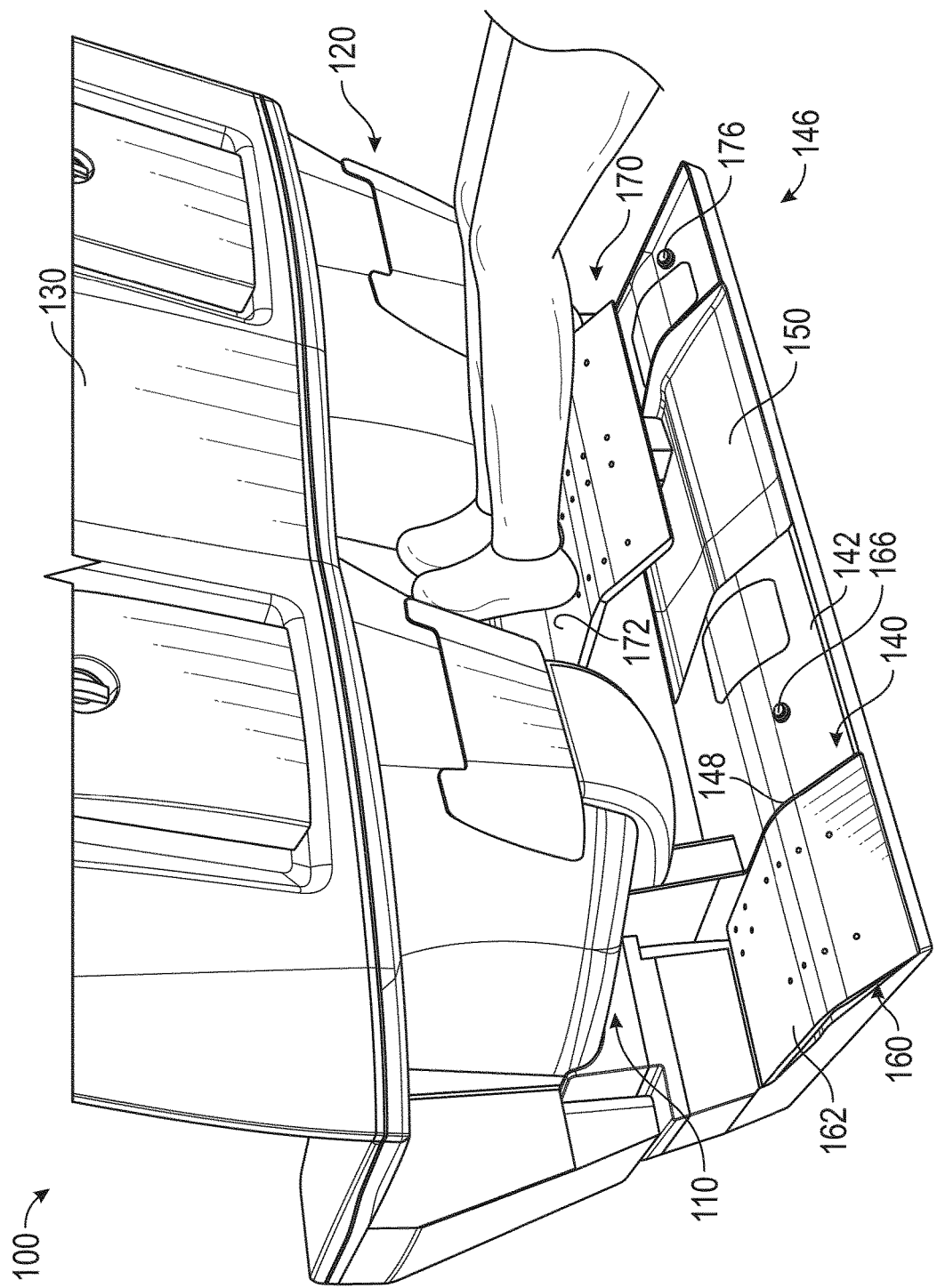
Figure 2C:
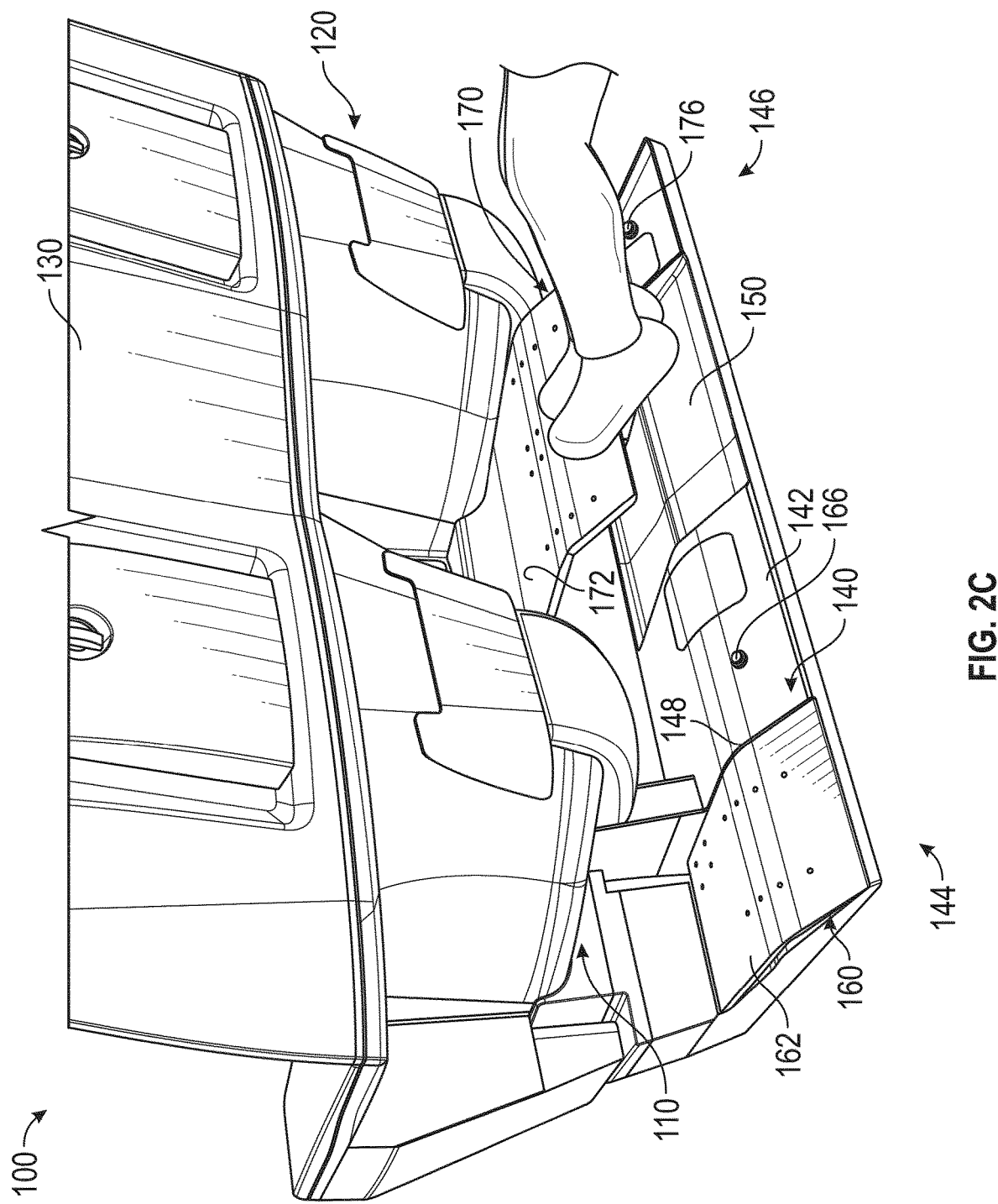

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an ottoman for an aircraft seating unit. The ottoman has a foot platform that is selectively deployable from a stowed positioned to a fully-deployed position, and in some embodiments, any position therebetween to facilitate infinite position adjustment (e.g., to accommodate passenger preference and comfort, etc.). In some embodiments, the foot platform translates along an axis that is on an angle relative to a vertical axis such that the foot platform moves both vertically and horizontally as the foot platform deploys. In some embodiments, the foot platform includes a horizontal plate and an angled plate extending from the horizontal plate at a downward angle to accommodate different passenger seating positions (e.g., a straight leg position, a bent knee position, etc.).

As shown in FIG. 1, a vehicle, shown as aircraft 10, has a fuselage, shown as cabin 20, that defines an axis, shown as longitudinal axis 30. A plurality of seating units, shown as aircraft seating units 100, are positioned within the cabin 20 and extend along the longitudinal axis 30. According to the exemplary embodiment shown in FIG. 1, the cabin 20 includes two columns of the aircraft seating units 100, one column positioned each side of an aisle, shown as cabin aisle 40. In other embodiments, the cabin 20 includes two or more cabin aisles 40 such that the aircraft 10 may include three or more columns of the aircraft seating units 100.

As shown in FIGS. 2A-6, the aircraft seating unit 100 includes a first passenger seat, shown as window seat 110, and a second passenger seat, shown as aisle seat 120. In other embodiments, the aircraft seating unit 100 includes a third passenger seat (i.e., a middle seat) positioned between the window seat 110 and the aisle seat 120. As shown in FIGS. 2A-4, the aircraft seating unit 100 includes a fixed partition, shown as partition 130, positioned rearward of the window seat 110 and the aisle seat 120 that runs continuously along the full length of the aircraft seating unit 100. As shown in FIG. 2A, the partition 130 includes a middle portion, shown a divider 132, that extends forward between the window seat 110 and the aisle seat 120. In some embodiments, the partition 130 additionally or alternatively includes a deployable partition that selectively deploys forward from the divider 132 to enhance privacy between the window seat 110 and the aisle seat 120.

As shown in FIGS. 2A-6, the window seat 110 and the aisle seat 120 are mounted to a single base, shown as platform 140. According to an exemplary embodiment, the platform 140 is securable to the deck of the aircraft 10, thereby fixing the aircraft seating unit 100 in a desired position along the cabin aisle 40. As shown in FIGS. 2A-2C, the partition 130 is elevated above the platform 140 and may serve as the mounting location for video monitors, tray tables, etc. for use by passengers seated in a second aircraft seating unit 100 rearward of the aircraft seating unit 100. The platform 140 extends substantially the length of the aircraft seating unit 100.

As shown in FIGS. 2A-6, the platform 140 includes an outer shell or cover, shown as platform housing 142. According to an exemplary embodiment, the platform housing 142 encloses various components of the aircraft seating unit 100 (e.g., frame member, beams, actuators, fasteners, etc.). As shown FIGS. 2A-6, the space between the platform 140 of the aircraft seating unit 100 and a second aircraft seating unit 100 positioned rearward thereof forms a first footwell, shown as window seat footwell 144, behind the window seat 110 and a second footwell, shown as aisle seat footwell 146, behind the aisle seat 120. According to an exemplary embodiment, the window seat footwell 144 and the aisle seat footwell 146 accommodate the feet and lower legs of passengers seated in the second aircraft seating unit 100 rearward of the aircraft seating unit 100. As shown in FIGS. 2A-4, the platform housing 142 defines a first cutout within the window seat footwell 144, shown as window ottoman recess 148, positioned behind the window seat 110 and toward the exterior wall of the cabin 20. As shown in FIGS. 2A-2C, 5, and 6, the platform housing 142 defines a second cutout within the aisle seat footwell 146, shown as aisle ottoman recess 150, positioned behind the aisle seat 120 toward the middle between the window seat 110 and the aisle seat 120.

Figure 3:
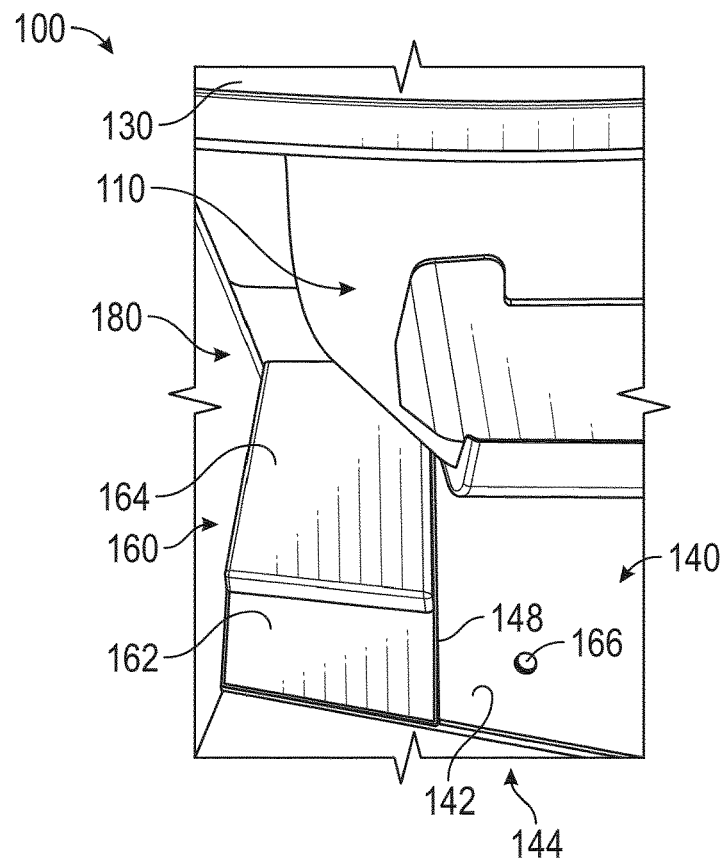
FIG. 3 is a perspective view of the first ottoman of FIGS. 2A-2C in a first position according to the inventive concepts disclosed herein.
Figure 4:
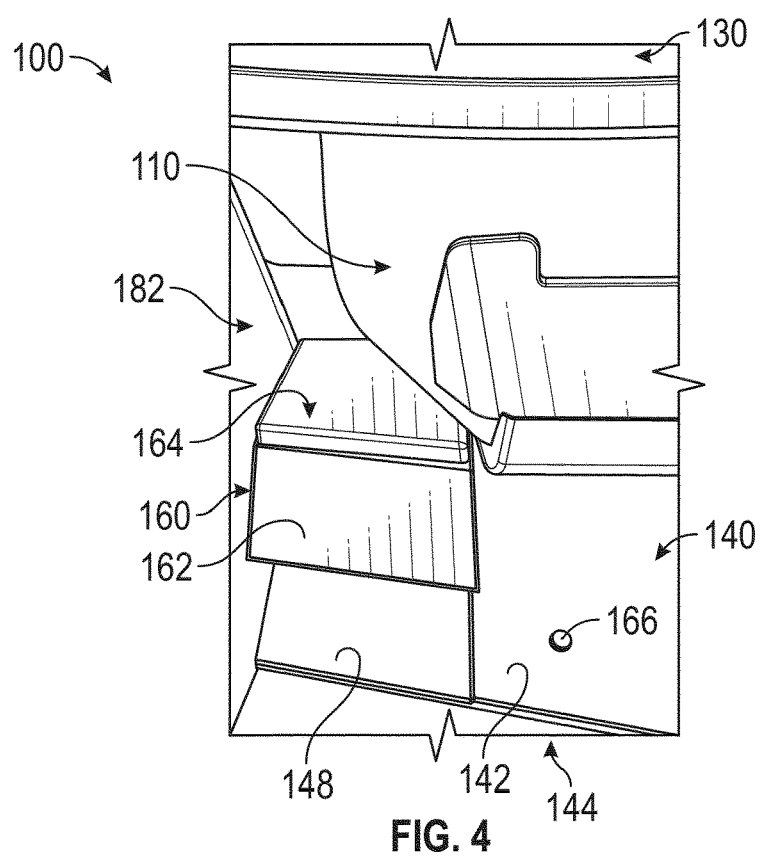
FIG. 4 is a perspective view of the first ottoman of FIG. 3 in a second position according to the inventive concepts disclosed herein.

As shown in FIGS. 2A-4, the aircraft seating unit 100 includes a first ottoman assembly, shown as window ottoman 160, disposed within the window ottoman recess 148 of the platform housing 142. The window ottoman 160 includes a first foot plate, shown as foot platform 162; a first padded portion, shown as foot pad 164, disposed on and along a top portion of the foot platform 162; and a first button, shown as activation button 166. As shown in FIGS. 3 and 4, the window ottoman 160 is selectively repositionable or deployable between a first position, shown as stowed position 180, where the foot platform 162 is recessed within the window ottoman recess 148 and flush with the platform housing 142, and a second position, shown as fully-deployed position 182, where the foot platform 162 extends from the window ottoman recess 148 and is elevated relative to the platform housing 142 adjacent the bottom of the window seat 110. According to an exemplary embodiment, the activation button 166 facilitates a passenger selectively actuating the foot platform 162 between the stowed position 180 and the fully-deployed position 182, and in some embodiments, any position therebetween (e.g., infinitely adjustable, etc.).

Figure 5:
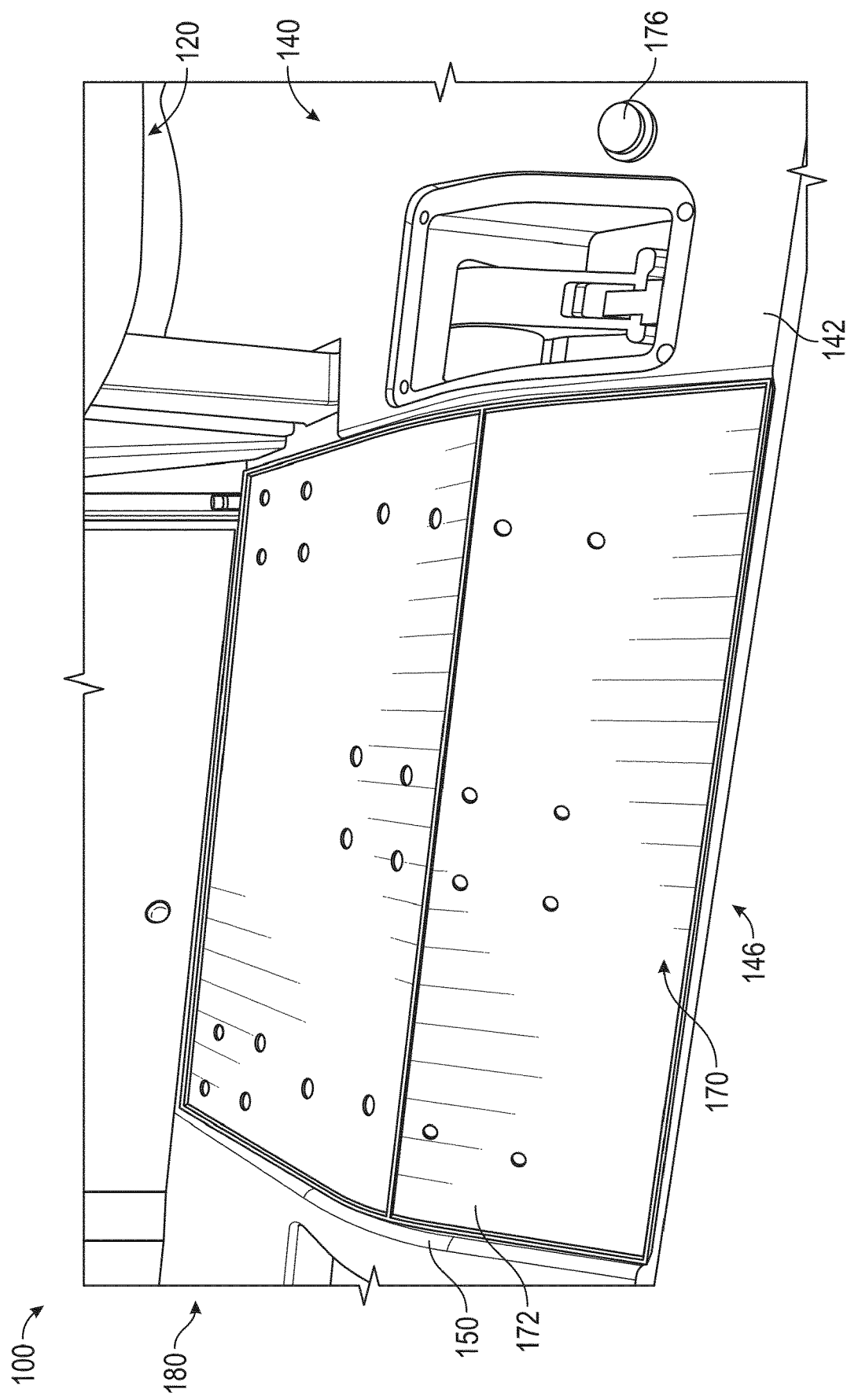
FIG. 5 is a perspective view of the second ottoman of FIG. 2A-2C in a first position according to the inventive concepts disclosed herein.
Figure 6:
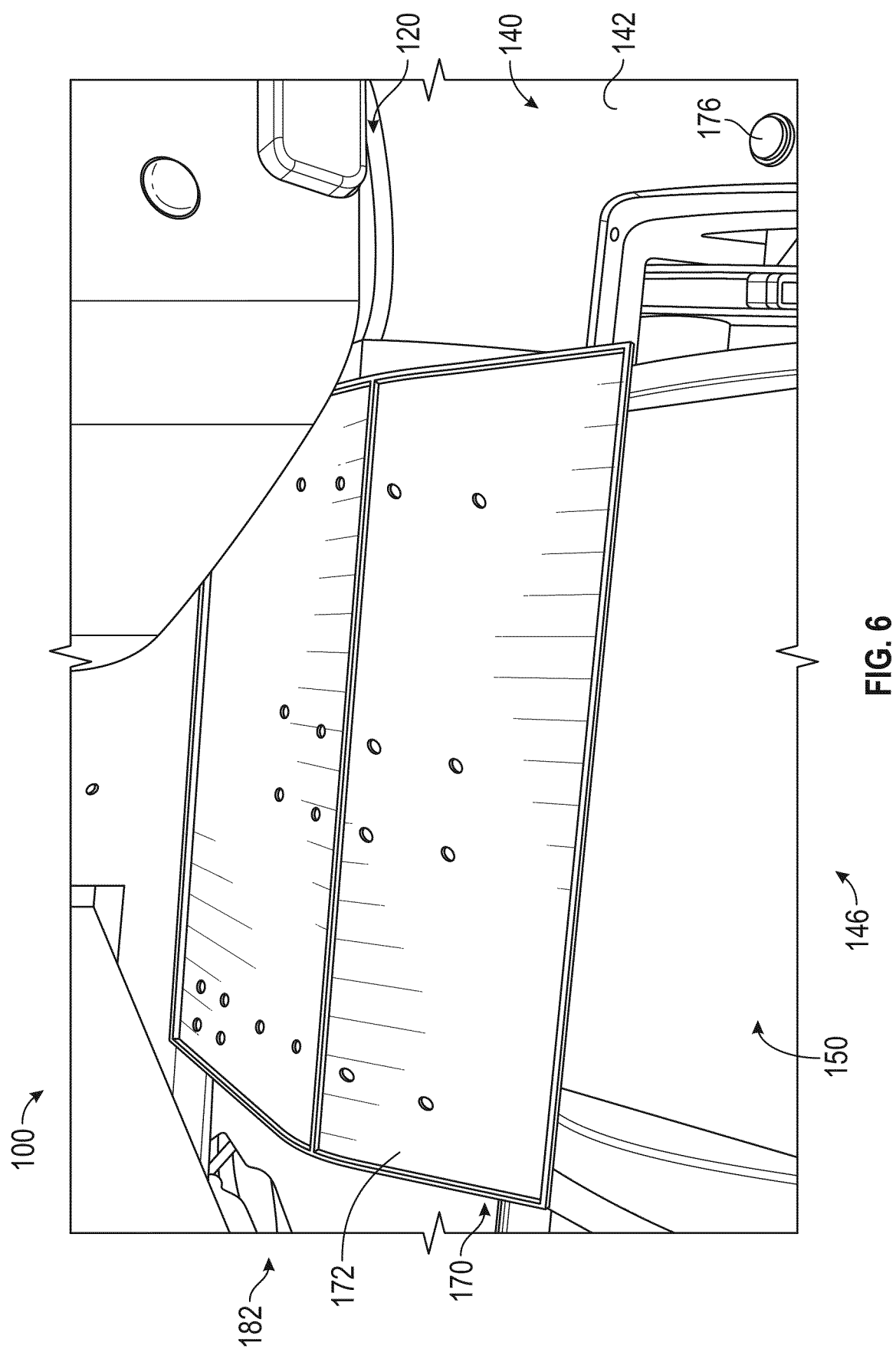
FIG. 6 is a perspective view of the second ottoman of FIG. 5 in a second position according to the inventive concepts disclosed herein.
Figure 7:
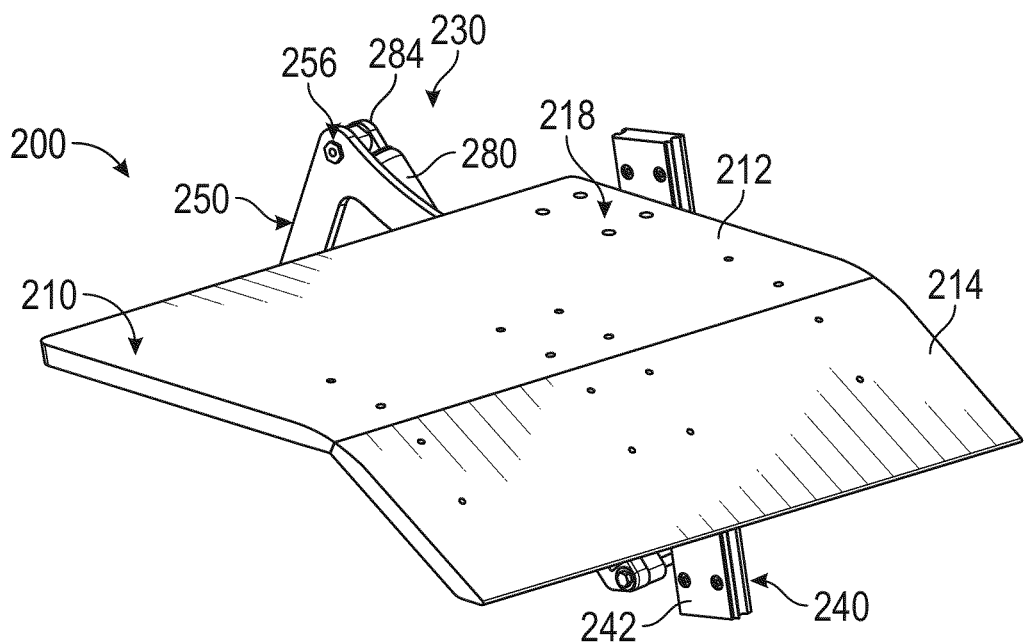
FIG. 7 is a first, front perspective view of an ottoman according to the inventive concepts disclosed herein.

As shown in FIGS. 2A-2C, 5, and 6, the aircraft seating unit 100 includes a second ottoman assembly, shown as aisle ottoman 170, disposed within the aisle ottoman recess 150 of the platform housing 142. The aisle ottoman 170 includes a second foot plate, shown as foot platform 172; a second padded portion, shown as foot pad 174, disposed on and along a top portion of the foot platform 172; and a second button, shown as activation button 176. As shown in FIGS. 5 and 6, the aisle ottoman 170 is selectively repositionable between the stowed position 180 where the foot platform 172 is recessed within the aisle ottoman recess 150 and flush with the platform housing 142, and the fully-deployed position 182 where the foot platform 172 extends from the aisle ottoman recess 150 and is elevated relative to the platform housing 142 adjacent the bottom of the aisle seat 120. According to an exemplary embodiment, the activation button 176 facilitates a passenger selectively actuating the foot platform 172 between the stowed position 180 and the fully-deployed position 182, and in some embodiments, any position therebetween (e.g., infinitely adjustable, etc.).

According to the exemplary embodiment shown in FIGS. 2A-6, the foot platform 162 and the foot platform 172 include a generally horizontal portion and an interconnected angled portion. The horizontal portions and the angled portions may be oriented to conform to the underlying shape of the platform housing 142, and as such, the shape may vary. The horizontal portions and the angled portions provide alternative resting locations for the feet and/or lower legs of a passenger depending on passenger preference and sitting position (see, e.g., FIGS. 2B and 2C). According to the exemplary embodiment shown in FIGS. 2A-2C, the aisle ottoman 170 is larger than the window ottoman 160. In other embodiments, the window ottoman 160 is larger than the aisle ottoman 170. In still other embodiments, the window ottoman 160 and the aisle ottoman 170 are the same or are substantially the same size. In embodiments where the aircraft seating unit 100 includes a third, middle seat, the aircraft seating unit 100 may also include a third or middle ottoman positioned between the window ottoman 160 and the aisle ottoman 170.

According to the exemplary embodiment shown in FIGS. 7-15, a selectively movable ottoman, shown as ottoman 200, includes various components that are configured and arranged to provide position adjustability to allow for more comfortable seating and lounge positions for passengers of varying heights, sizes, preferences, etc. It should be understood that the ottoman 200 may be the window ottoman 160 and/or the aisle ottoman 170.

As shown in FIGS. 7-15, the ottoman 200 includes a foot plate, shown as foot platform 210; a bracket, shown as coupling bracket 220; and an actuator system, shown as actuator assembly 230, having one or more components coupled to the foot platform 210 by the coupling bracket 220. The actuator assembly 230 includes a guide assembly, shown as slide assembly 240; a pivotable arm, shown as swing arm 250; a first coupler, shown as first pivotable coupler 260; a second coupler, shown as second pivotable coupler 270; and a drive element, shown as actuator 280.

Figure 14:
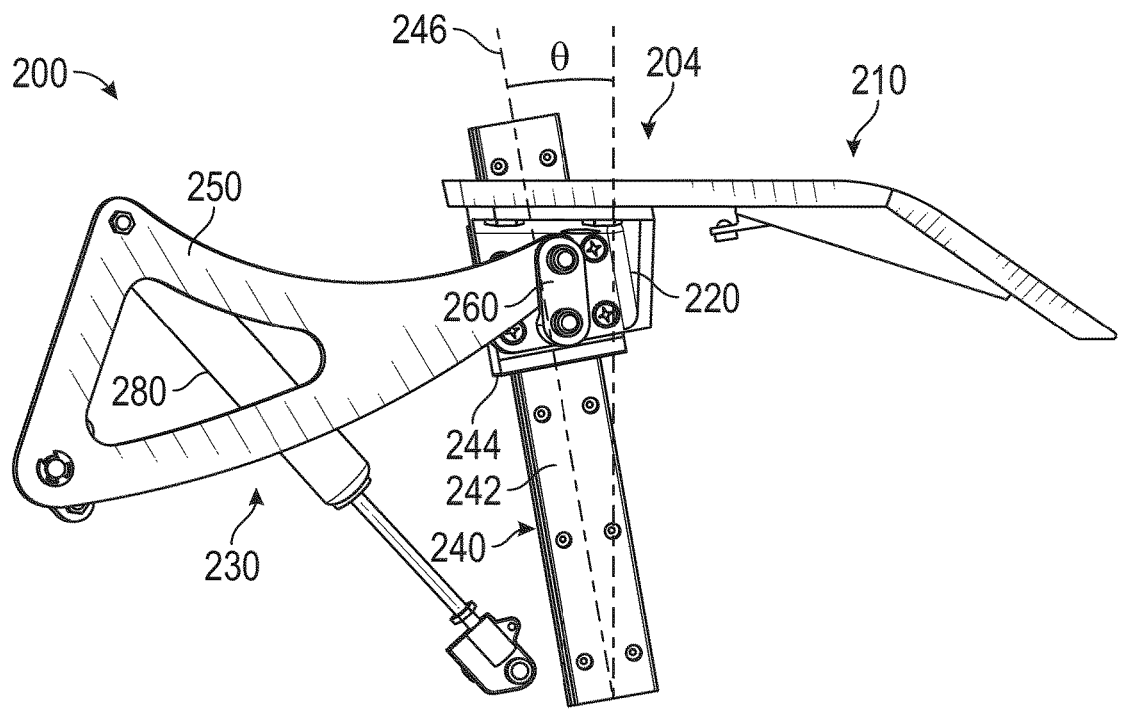
FIGS. 14 and 15 are side views of the ottoman of FIG. 7 in a second position according to the inventive concepts disclosed herein.
Figure 15:
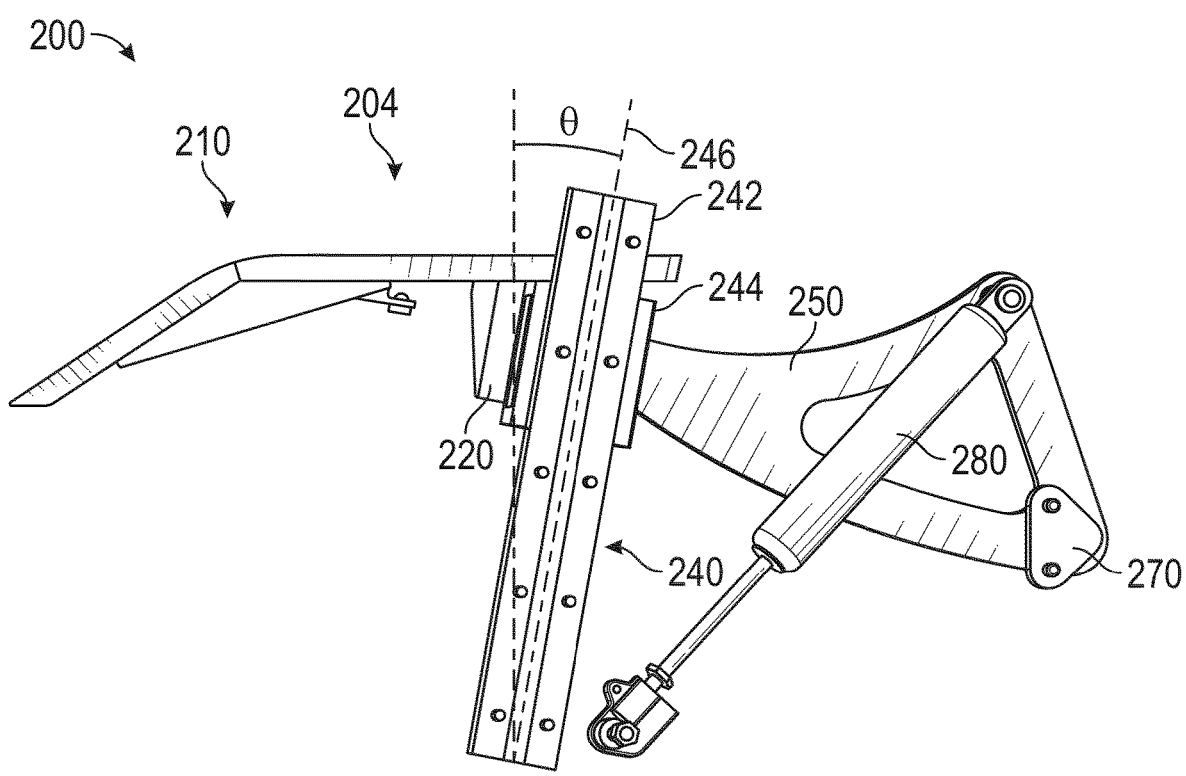

According to the exemplary embodiment shown in FIGS. 12-15, the actuator assembly 230 is configured to facilitate selectively repositioning the foot platform 210 at any desired positioned (e.g., infinitely adjustable, etc.) between a first, lower most position (e.g., the stowed position 180, etc.), shown as stowed position 202 (see, e.g., FIGS. 12 and 13), and a second, upper most position (e.g., the fully-deployed position 182, etc.), shown as fully-deployed position 204 (see, e.g., FIGS. 14 and 15). According to an exemplary embodiment, the actuator assembly 230 is selectively controllable by a passenger using a manually engageable button (e.g., the activation button 166, the activation button 176, etc.). In other embodiments, the actuator assembly 230 is selectively controllable by a passenger using a controller and/or a graphical user interface accessible from their seat (e.g., the window seat 110, the aisle seat 120, etc.).

As shown in FIGS. 7-11, the foot platform 210 of the ottoman 200 includes a first, substantially horizontal portion, shown as horizontal plate 212; a second, angled portion, shown as angled plate 214, extending from the horizontal plate 212 at downward angle; and a third portion, shown as support 216, that spans an intersection between the horizontal plate 212 and the angled plate 214 to couple (e.g., secure, etc.) the two together to form the foot platform 210. In other embodiments, the horizontal plate 212 and the angled plate 214 are a unitary component (e.g., integrally formed, welded, etc.). In some embodiments, the horizontal plate 212 has a padded portion (e.g., the foot pad 164, the foot pad 174, etc.) disposed thereon for increased comfort of a passenger. According to an exemplary embodiment, the horizontal plate 212 allows a passenger to rest their heels and/or legs thereon when their legs are extended straight (see, e.g., FIG. 2B) and the angled plate 214 allows a passenger to rest their feet thereon when their legs are bent (see, e.g., FIG. 2C).

Figure 8:
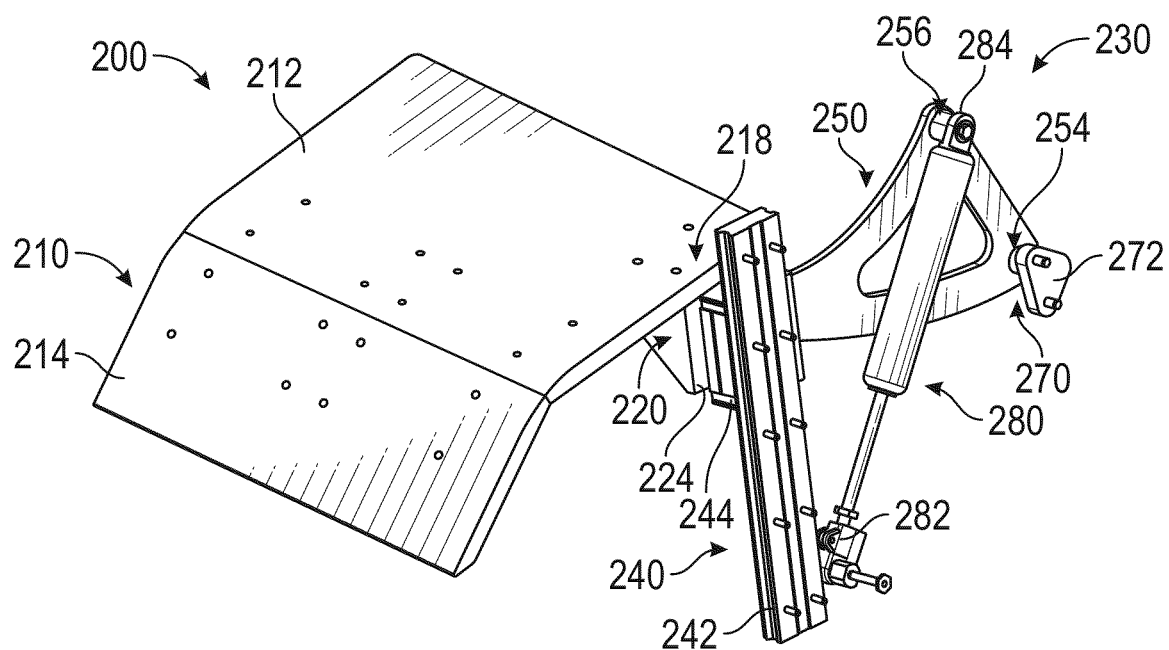
FIG. 8 is a second, front perspective view of the ottoman of FIG. 7 according to the inventive concepts disclosed herein.
Figure 9:
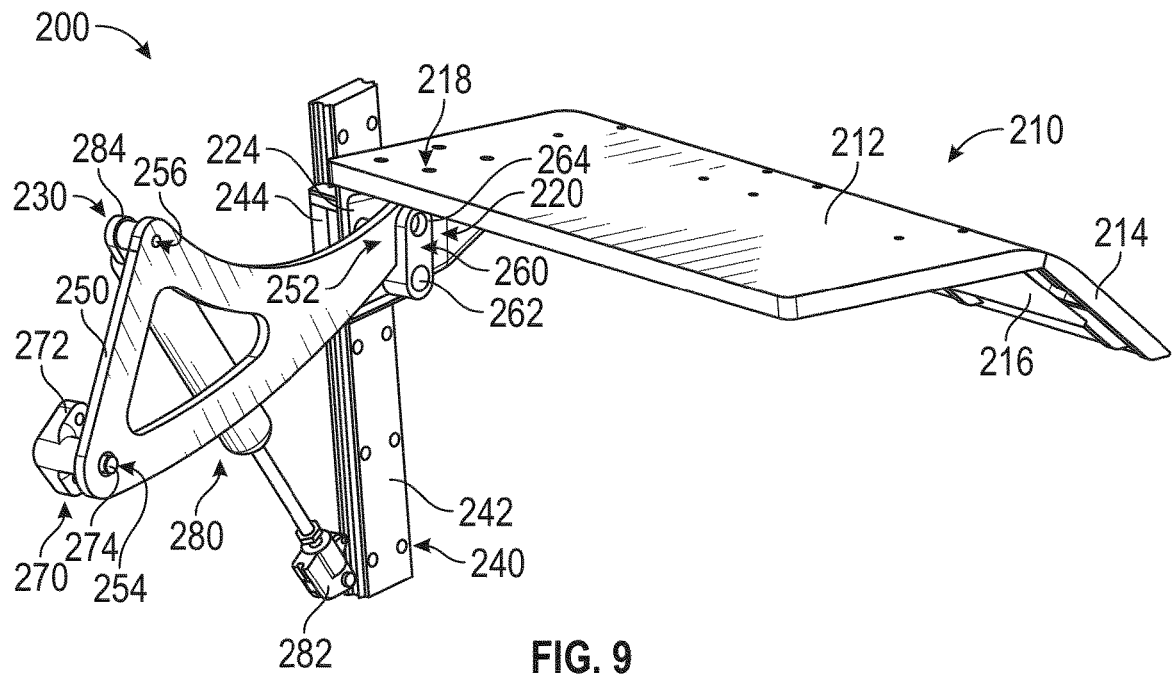
FIG. 9 is a first, rear perspective view of the ottoman of FIG. 7 according to the inventive concepts disclosed herein.
Figure 10:
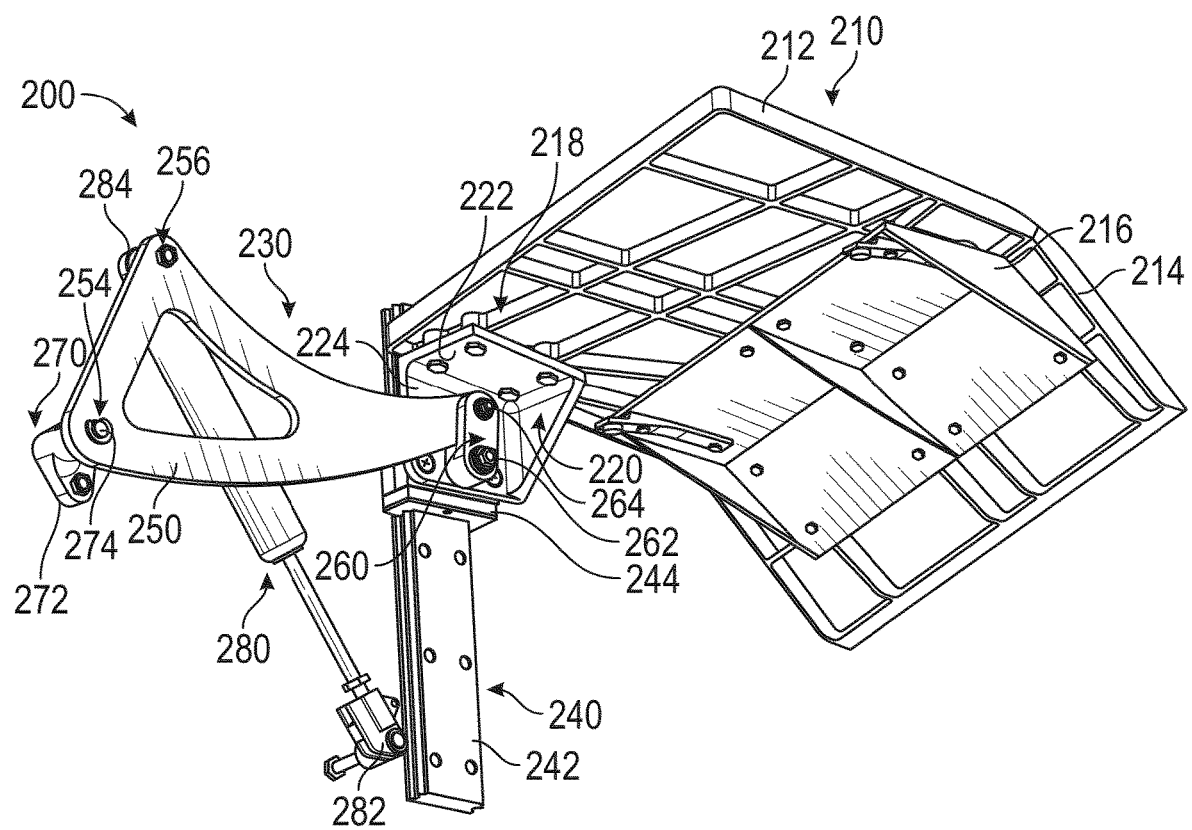
FIG. 10 is a second, rear perspective view of the ottoman of FIG. 7 according to the inventive concepts disclosed herein.
Figure 11:
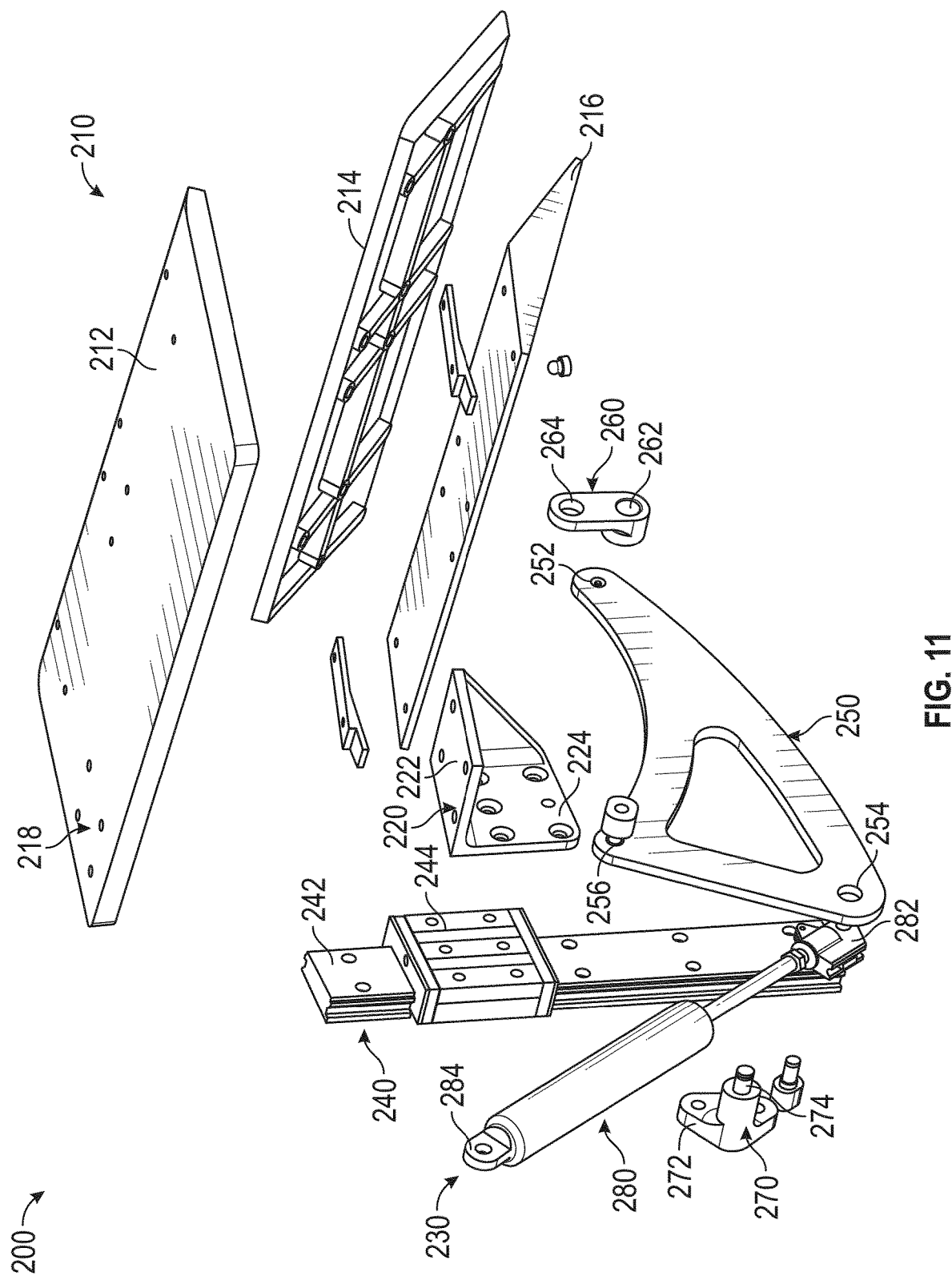
FIG. 11 is an exploded perspective view of the ottoman of FIG. 7 according to the inventive concepts disclosed herein.
Figure 12:
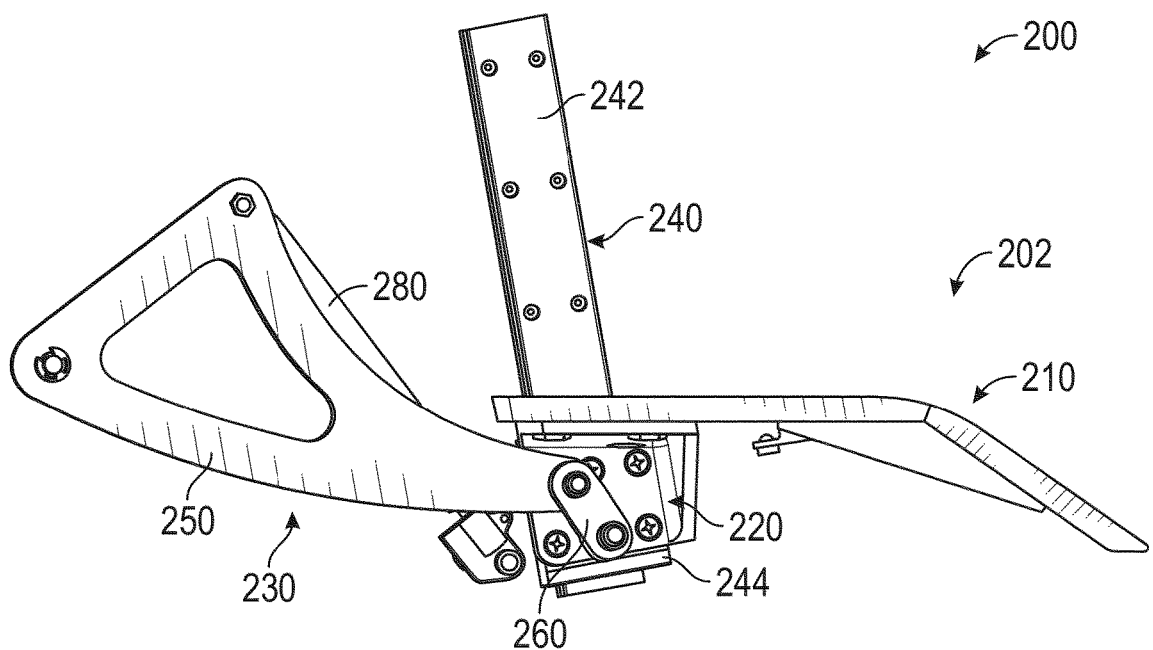
FIGS. 12 and 13 are side views of the ottoman of FIG. 7 in a first position according to the inventive concepts disclosed herein.
Figure 13:
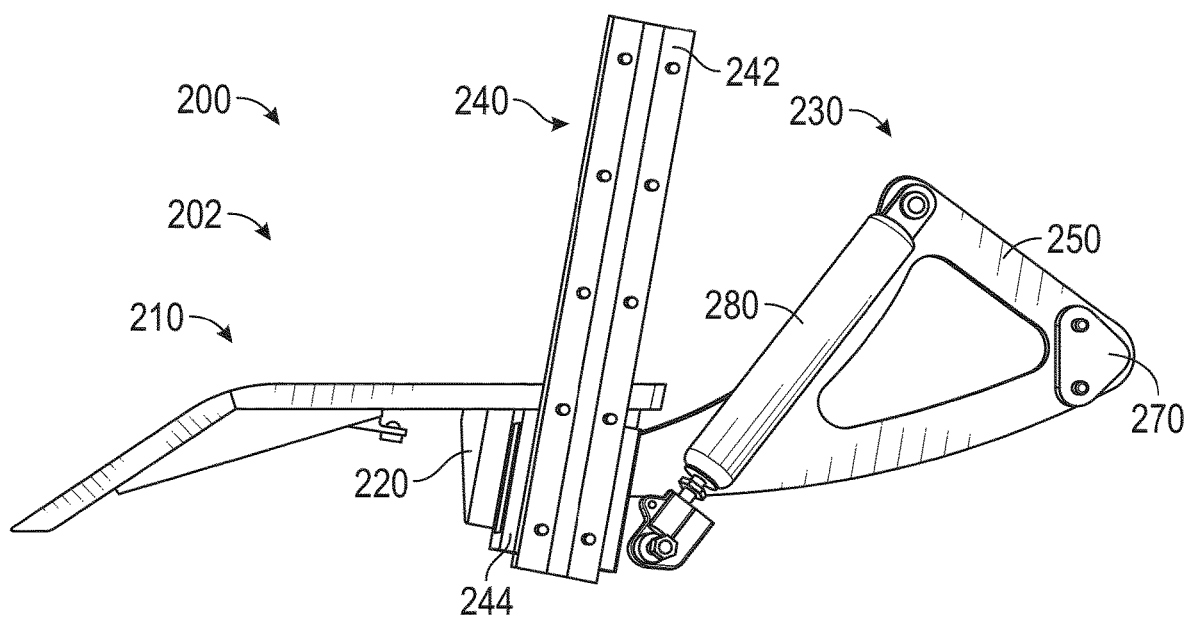

As shown in FIGS. 8-11, the coupling bracket 220 has a first plate, shown as upper plate 222, and a second plate, shown as side plate 224, extending perpendicularly from the upper plate 222. As shown in FIGS. 7-11, the horizontal plate 212 defines an interface, shown as coupling interface 218, that includes a plurality of apertures. As shown in FIG. 11, the upper plate 222 of the coupling bracket 220 defines corresponding apertures. As shown in FIG. 10, the upper plate 222 of the coupling bracket 220 is configured to engage with the coupling interface 218 of the horizontal plate 212 and releasably couple to the horizontal plate 212 via a plurality of fasteners that are cooperatively received by the apertures of the horizontal plate 212 and the upper plate 222 of the coupling bracket 220. In other embodiments, the coupling bracket 220 is integrally formed with the horizontal plate 212.

As shown in FIGS. 7-15, the slide assembly 240 includes a guide member, shown as guide 242, and a sliding member, shown as slide 244, slidably coupled to the guide 242 such that the slide 244 selectively translates along the guide 242 when the foot platform 210 is deployed from the stowed position 202 to the fully-deployed position 204. As shown in FIG. 11, the side plate 224 of the coupling bracket 220 defines a plurality of apertures and the slide 244 defines corresponding apertures. As shown in FIGS. 8-10, the side plate 224 of the coupling bracket 220 is configured to engage with and releasably couple to the slide 244 via a plurality of fasteners that are cooperatively received by the apertures of the side plate 224 and the slide 244 to thereby couple the foot platform 210 to the slide 244. In other embodiments, the coupling bracket 220 is integrally formed with the slide 244. According to an exemplary embodiment, the guide 242 is configured to couple to (e.g., be fasten to, be fixed to, be secured to, etc.) a portion of the aircraft seating unit 100 (e.g., a frame member of the window seat 110, a frame member of the aisle seat 120, etc.).

As shown in FIGS. 7-11, the swing arm 250 defines a first interface (e.g., a first aperture, etc.), shown as interface 252; a second interface (e.g., a second aperture, etc.), shown as interface 254; and a third interface (e.g., a third aperture, etc.), shown as interface 256. As shown in FIGS. 9-11, the first pivotable coupler 260 defines a first interface, shown as bracket interface 262, and a second interface, shown as swing arm interface 264. As shown in FIGS. 9 and 10, the bracket interface 262 engages with the side plate 224 of the coupling bracket 220 and the swing arm interface 264 engages with the interface 252 of the swing arm 250 to couple the swing arm 250 to the coupling bracket 220. The first pivotable coupler 260 is configured to facilitate pivotal movement of the swing arm 250 relative to the coupling bracket 220 (see, e.g., FIGS. 12 and 14).

As shown in FIGS. 8-11, the second pivotable coupler 270 has a first portion, shown as base 272, and a second portion, shown as protrusion 274, extending from the base 272. As shown in FIGS. 9 and 10, the protrusion 274 is configured to extend through the interface 254 of the swing arm 250 such that the swing arm 250 is pivotally coupled to second the pivotable coupler 270. According to an exemplary embodiment, the base 272 is configured to couple to (e.g., be fasten to, be fixed to, be secured to, etc.) a portion of the aircraft seating unit 100 (e.g., a frame member of the window seat 110, a frame member of the aisle seat 120, etc.). Accordingly, the swing arm 250 may thereby selectively pivot about the protrusion 274 of the second pivotable coupler 270 (see, e.g., FIGS. 12-15).

As shown in FIGS. 7-11, the actuator 280 includes a first end, shown as lower end 282, and an opposing second end, shown as upper end 284. As shown in FIGS. 7-10, the upper end 284 of the actuator 280 is configured to pivotally couple to the interface 256 of the swing arm 250 (e.g., via a spacer and fastener, etc.). According to an exemplary embodiment, the lower end 282 of the actuator 280 is configured to interface with the manually engageable button (e.g., the activation button 166, the activation button 176, via an intermediate structure, etc.). According to an exemplary embodiment, the actuator 280 is a locking spring actuator that extends when the button is engaged and stops when the button is not engaged. In other embodiments, the actuator 280 is an electrically-powered actuator, a pneumatically-powered actuator, and/or still another suitable type of actuator.

According to an exemplary embodiment, engagement of the button (e.g., the activation button 166, the activation button 176, etc.) causes the actuator 280 to extend such that the upper end 284 extends away from the lower end 282, causing the swing arm 250 to pivot about the second pivotable coupler 270. Such pivoting about the second pivotable coupler 270 in turn causes the swing arm 250 to drive the slide 244 to translate along the guide 242, thereby repositioning (e.g., moving, lifting, etc.) the foot platform 210.

As shown in FIGS. 14 and 15, the guide 242 defines an axis, shown as translation axis 246, along which the slide 244 translates as the foot platform 210 is deployed to the fully-deployed position 204. According to the exemplary embodiment shown in FIGS. 14 and 15, the translation axis 246 extends at an angle θ relative to a vertical axis. In one embodiment, the angle θ is ten degrees forward of the vertical axis (e.g., the guide 242 is angled toward the seat of the aircraft seating unit 100 and away from the passenger sitting therebehind, etc.). In another embodiment, the angle θ is ten degrees rearward of the vertical axis (e.g., the guide 242 is angled away the seat of the aircraft seating unit 100 and toward from the passenger sitting therebehind, etc.). In other embodiments, the angle θ is greater than or less than ten degrees (e.g., five degrees, eight degrees, fifteen degrees, twenty degrees, at most ten degrees, at least ten degrees, etc.). Accordingly, as the slide 244 translates along the guide 242, the foot platform 210 is repositioned in two directions, i.e., both vertically and horizontally. In other embodiments, the angle θ is zero such that the guide 242 is completely vertical and the foot platform is repositioned in a single direction, i.e., vertically. In one embodiment, the foot platform 210 travels at least six inches (e.g., six inches, eight inches, ten inches, etc.; vertically, along the guide 242, etc.) from the stowed position 202 to the fully-deployed positioned 204. In other embodiments, the foot platform 210 travels less than six inches from the stowed position 202 to the fully-deployed positioned 204.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The invention claimed is:

1. An ottoman for an aircraft seat, the ottoman comprising:
 a guide assembly configured to couple to a frame of the aircraft seat at a location below and to a rear of the aircraft seat, the guide assembly including a guide and a slide that is translatable along the guide;
 a foot platform coupled to the slide, the foot platform including a flat surface defining a horizontal plane, wherein the guide defines a translation axis, and wherein the translation axis is angled relative to a vertical axis that is perpendicular to the horizontal plane such that, as the slide translates along the guide, the foot platform moves both vertically and horizontally; and
 an actuator assembly configured to selectively translate the slide along the guide to reposition the foot platform between a stowed position and a deployed position, the actuator assembly including:
  an actuator; and
  an arm defining a first interface pivotally coupled to the slide, a second interface pivotally coupled to the actuator, and a third interface configured to be pivotally coupled to the frame of the aircraft seat, wherein the first interface, the second interface, and the third interface are positioned at fixed distances from each other, and wherein engagement of the actuator causes the arm to pivot and move the slide along the guide.

2. The ottoman of claim 1, wherein an angle between the translation axis and the vertical axis is at most ten degrees.

3. The ottoman of claim 1, wherein an angle between the translation axis and the vertical axis is at least ten degrees.

4. The ottoman of claim 1, wherein the foot platform includes an angled portion extending downward from the flat surface at an angle.

5. The ottoman of claim 4, wherein the flat surface and the angled portion are separate components coupled together by a support.

6. The ottoman of claim 1, wherein the foot platform is selectively repositionable to any position between the stowed position and a fully-deployed position.

7. An ottoman for an aircraft seat, the ottoman comprising:
- a guide assembly configured to couple to a frame of the aircraft seat at a location below and to a rear of the aircraft seat, the guide assembly including a guide and a slide that is translatable along the guide;
- a foot platform coupled to the slide; and
- an actuator assembly configured to selectively translate the slide along the guide to reposition the foot platform between a stowed position and a deployed position, the actuator assembly including:
  - an actuator;
  - an atm defining a first interface pivotally coupled to the slide and a second interface pivotally coupled to the actuator, wherein engagement of the actuator causes the arm to pivot and move the slide along the guide; and
  - a pivotable coupler configured to couple to the frame of the aircraft seat, wherein the arm defines a third interface configured to engage the pivotable coupler, wherein the arm pivots about the pivotable coupler, and wherein the first interface, the second interface, and the third interface are positioned at fixed distances from each other.

8. The ottoman of claim 7, wherein an angle between a translation axis and a vertical axis is at most ten degrees.

9. The ottoman of claim 8, wherein the foot platform includes an angled portion extending downward from a flat surface.

10. The ottoman of claim 7, wherein an angle between a translation axis and a vertical axis is at least ten degrees.

11. The ottoman of claim 10, wherein the foot platform includes an angled portion extending downward from a flat surface.

12. The ottoman of claim 11, wherein the flat surface and the angled portion are separate components coupled together by a support.

13. The ottoman of claim 7, wherein the foot platform includes an angled portion extending downward from a flat surface.

14. The ottoman of claim 13, wherein the flat surface and the angled portion are separate components coupled together by a support.

15. An ottoman for an aircraft seat, the ottoman comprising:
- a guide assembly including a guide and a slide that is translatable along the guide;
- a foot platform coupled to the slide; and
- an actuator assembly configured to selectively translate the slide along the guide to reposition the foot platform between a stowed position and a deployed position;
- wherein the guide defines a translation axis that is angled relative to a vertical axis such that, as the slide translates along the guide, the foot platform moves both vertically and horizontally.

16. The ottoman of claim 15, wherein an angle between the translation axis and the vertical axis is at most ten degrees.

17. The ottoman of claim 15, wherein an angle between the translation axis and the vertical axis is at least ten degrees.

18. The ottoman of claim 15, wherein the foot platform includes an angled portion extending downward from a flat surface at an angle.

19. The ottoman of claim 18, wherein the flat surface and the angled portion are separate components coupled together by a support.

* * * * *